T. A. STEPHAN.
Beer and Liquor Protector.
No. 220,679.          Patented Oct. 14, 1879.
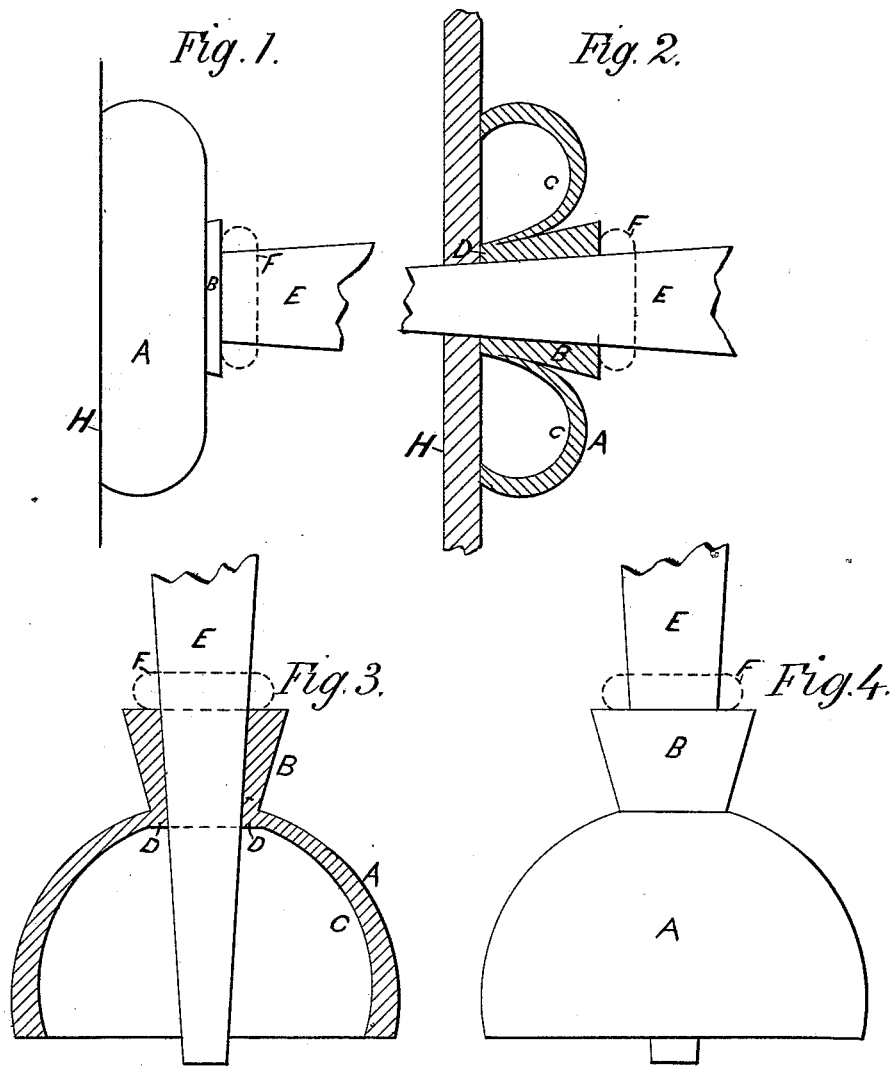

UNITED STATES PATENT OFFICE.

THOMAS A. STEPHAN, OF CINCINNATI, OHIO.

IMPROVEMENT IN BEER AND LIQUOR PROTECTORS.

Specification forming part of Letters Patent No. 220,679, dated October 14, 1879; application filed September 16, 1879.

*To all whom it may concern:*

Be it known that I, THOS. A. STEPHAN, of Cincinnati, in the county of Hamilton and State of Ohio, have invented certain new and useful Improvements in Beer and Liquor Protectors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 represents an elevation of my invention when in operation. Fig. 2 represents a section of the same. Fig. 3 represents a section of my invention before it is put into operation. Fig. 4 represents an elevation of the same.

The object of my invention is to furnish a device which, when used in connection with faucets, will prevent beer and other liquors from spurting when tapping the vessel containing the same.

My invention consists in a hollow rubber, made globular in form, with a tapering projection extending from its top, with an opening therein for the reception of the faucet.

That part of the rubber globe which rests against the head of the keg or other vessels containing liquors is cut just below the center of a true circle, in order to prevent it from expanding when resisting a heavy pressure. The surface that rests against the head of the vessels containing liquors is made broad, from which it gradually tapers toward the upper part, the same being made or formed by the eccentric of the inner circumference, the object of which is to give less power of resistance to that portion of the rubber globe which must necessarily yield in order to operate properly.

The upper part of the inner circumference is provided with a plain surface, which fits around the bung-hole when in operation.

The projection extending from the upper part of the globular formation is made to taper, the larger diameter being at the top, in order to resist expansion when driving the faucet.

In the drawings, A represents the rubber globe, provided with a tapering projection, B. The inner circumference, C, is provided with a plain surface, D, at its upper extremity.

E represents the faucet, provided with a metal ring to prevent the rubber from slipping too far on the faucet.

H is the head of a vessel containing liquor, against which the rubber globe is pressed.

The faucet E extends just below that portion of the rubber globe that rests against the head of the keg, so as to allow the rubber to press heavily against it before the bung is driven out of place.

When the faucet is driven in as far as necessary the plain surface D of the inner circumference fits tightly around the bung-hole, while the globular formation assumes another shape, which produces a powerful suction, thereby holding itself tightly to the head of the keg, and prevents the beer or liquor from spurting when tapping the keg.

The mode heretofore used for tapping vessels containing liquor was simply to drive the faucet into the bung-hole, without any means whatever to prevent the liquor from spurting. This I obviate by my invention, which I have fully shown and described in the foregoing.

What I claim as new, and desire to secure by Letters Patent, is—

1. A beer and liquor protector composed of rubber, made globular in form, with an inner circumference, C, made eccentric to the outer circumference of the globular formation A, substantially as shown and described.

2. In combination with a beer and liquor protector, the tapering projection B, having its larger diameter at the top, to resist expansion when driving the faucet, and the plain surface D, which fits tightly around the bung-hole when in operation, substantially as shown and described.

In testimony that I claim the foregoing I have hereunto set my hand this 12th day of September, 1879.

THOS. A. STEPHAN.

Witnesses:
C. W. HURDLE,
D. KELLY.